United States Patent
Werdecker et al.

(10) Patent No.: US 6,380,110 B1
(45) Date of Patent: Apr. 30, 2002

(54) PROCESS FOR MAKING OPAQUE QUARTZ, FOR CARRYING OUT THE PROCESS SUITABLE SIO$_2$ GRANULATE, AND COMPONENT OF OPAQUE QUARTZ GLASS

(75) Inventors: Waltraud Werdecker, Hanau; Heinz Fabian, Grossostheim; Udo Gertig, Johannesberg; Johann Leist, Altenstadt; Rolf Göbel, Gelnhausen, all of (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/484,113

(22) Filed: Jan. 14, 2000

(30) Foreign Application Priority Data

Dec. 22, 1999 (DE) .......................... 199 62 451

(51) Int. Cl.$^7$ .............................................. C03B 20/00
(52) U.S. Cl. .......................................... 501/54; 65/32.1
(58) Field of Search ........................... 501/54; 65/32.1; 423/335

(56) References Cited

U.S. PATENT DOCUMENTS

| | | | |
|---|---|---|---|
| 4,243,422 A | * | 1/1981 | Lenz et al. |
| 5,643,347 A | | 7/1997 | Werdecker et al. |
| 5,776,240 A | * | 7/1998 | Deller et al. |
| 6,071,487 A | * | 6/2000 | Campion et al. ........... 423/338 |

FOREIGN PATENT DOCUMENTS

| | | | |
|---|---|---|---|
| EP | 0 816 297 A1 | | 1/1998 |
| GB | 2316414 A | * | 2/1998 |
| JP | 02219814 A | * | 9/1990 |
| JP | 03026717 A | * | 2/1991 |
| JP | 09208809 A | * | 8/1997 |

* cited by examiner

*Primary Examiner*—David Sample
(74) *Attorney, Agent, or Firm*—Andrew L. Tiajoloff

(57) ABSTRACT

In a known process for the production of opaque quartz glass a blank is formed from synthetic SiO$_2$ granulate and is heated at a vitrification temperature to form a body of opaque quartz glass. In order to provide on this basis a process for the production of pure opaque quartz glass with a homogenous pore distribution, high density, high viscosity and a low tendency to devitrify, it is proposed according to the invention that the SiO$_2$ granulate to be used is a SiO$_2$ granulate (21; 31) composed of at least partially porous agglomerates of SiO$_2$ primary particles, with a specific BET surface ranging from 1.5 m$^2$/g to 40 m$^2$/g and an apparent density of at least 0.8 g/cm$^3$. A SiO$_2$ granulate (21; 31) suitable for the implementation of the process is distinguished in that it is formed from at least partially porous agglomerates of SiO$_2$ primary particles and in that it has a specific BET surface ranging from 1.5 m$^2$/g to 40 m$^2$/g and an apparent density of at least 0.6 g/cm$^3$.

13 Claims, 1 Drawing Sheet

PROCESS FOR MAKING OPAQUE QUARTZ, FOR CARRYING OUT THE PROCESS SUITABLE SIO₂ GRANULATE, AND COMPONENT OF OPAQUE QUARTZ GLASS

DESCRIPTION

The invention relates to a process for the manufacture of opaque quartz glass by forming an initial body from synthetic $SiO_2$ granules and heating said body at a vitrification temperature to obtain a preform of opaque quartz glass.

Furthermore, the invention relates to a synthetic granulate suitable for the process, said granulate being prepared from at least partially porous agglomerates of $SiO_2$ primary particles.

Opaque quartz glass is primarily utilized in heat-technology applications where good thermal insulation and high temperature stability are of importance. Increasingly higher demands are made in these fields regarding the purity of such quartz glass bodies. The following examples of applications in the semiconductor industry may be mentioned: reactors, diffusion tubes, heat shields, bells or flanges. Primarily, opacity in the IR spectrum is required in these applications. Opacity means in this context low transmittance (less than one percent) both in the visible (approximately form 350 to 800 nm) and the IR spectra (approximately from 750 to 4,800 nm). In quartz glass of low purity the desired opacity occurs by itself due to the contaminants contained therein. On the other hand, when pure source materials are used, transparent quartz glass is obtained so that the opacity must be created by artificially introduced pores. The subject of the present invention is the production of opaque quartz glass from pure source materials.

A process of this kind for the production of opaque quartz glass from pure source materials is described in EP A1 816,297. It is proposed there to create opacity in the quartz glass by making and melting a powder mixture of synthetically produced $SiO_2$ particles having an average particle size of 300 μm and an additive material in form of powdered silicon nitride. Gaseous components such as nitrogen are released during the melting of the powder due to the thermal decomposition of the $Si_3N_4$ powder. The gaseous components cause bubbles to be formed in the softened quartz glass thus creating the desired opacity of the body. A graphite mold lined with graphite felt is filled with the powder mixture and heated in an electric furnace in a vacuum at a temperature of 1,800° C. During the melting the frontal region of the softening and melting quartz glass advances as a "melt front" radially outward from the walls of the mold.

Devitrification of the quartz glass can take place due to contaminants, leading to brittleness and reduced resistance to temperature change. Remnants of the additive material can also diminish the quality of the quartz glass in this respect. Pore growth can also take place during vitrification, with large pores growing at the expense of smaller ones. However, large pores contribute little to opacity, lead to a lesser density of the opaque quartz glass and reduce the mechanical strength of the quartz glass body.

A $SiO_2$ granulate of this kind is known from DE A1 44 24 044. It is proposed therein that an aqueous suspension of silicic powder manufactured in a pyrogenic process be treated in a mixing container by rotating agitators. The rotational velocity in a first mixing phase is between 15 and 30 m/s, and 30 m/s or more in a second mixing phase. The solids content of the suspension is at least 75% by weight during the first mixing. A granular mass with an average granule diameter of less than 4 mm results from the first mixing phase. The granular mass is further consolidated by addition of amorphous silicic dust and the granular mass is reduced in size in a second mixing phase by intensive mixing and beating. Water emerges from the surface of the granular mass and is absorbed by addition of more silicic dust in order to prevent lumping of the granulate. The known process provides a pourable $SiO_2$ granulate of high powder density, suitable for applications as filler in dentistry or as catalyst support.

The object of the invention is to provide a process for the manufacture of pure opaque quartz glass with homogenous pore distribution and also with high density, high viscosity and low tendency to devitrify. The object of the invention is also to provide a $SiO_2$ granulate suitable to carrying out the process.

As concerns the process, the object is achieved according to the invention on the basis of the process cited initially in that the employed $SiO_2$ granulate is formed from at least partially porous agglomerates of $SiO_2$ primary particles, has a specific BET surface ranging from 1.5 $m^2/g$ to 40 $m^2/g$ and an apparent density of at least 0.8 $g/cm^3$.

Vitrification of a starting body formed from at least partially porous agglomerates of $SiO_2$ primary particles with a specific BET surface ranging from 1.5 $m^2/g$ to 40 $m^2/g$ to an apparent density of at least 0.8 $g/cm^3$, produces opaque pure quartz glass exhibiting homogenous pore distribution and high density, high viscosity and low tendency to devitrify. An article produced from the opaque quartz glass is distinguished by good heat insulation and long service life at high temperatures.

The $SiO_2$ granulate is present in form of at least partially porous agglomerates of $SiO_2$ primary particles. Such primary particles are obtained by for example flame hydrolysis or oxidation of silica compounds, by hydrolysis of organic silica compounds in a so-called sol-gel process or by hydrolysis of inorganic silica compounds in a liquid. Even though such primary particles stand out due to their high purity they are difficult to handle due to their low powder density. Therefore compacting by granulation processes is conventionally used. Agglomerates with greater diameters are formed due to the lumping together of fine primary particles. These agglomerates have a number of open pore channels, forming a correspondingly large volume of pores. The individual granules of the $SiO_2$ granulate used in the process according to the invention are formed from such agglomerates. Due to the large pore volume the granulate is distinguished by a specific BET surface ranging from 1.5 $m^2/g$ to 40 $m^2/g$. This surface therefore does not appear as outer surface but predominantly as inner surface in form of pore channels. During vitrification of the starting body the larger part of the pore volume closes due to sintering and collapsing. However, a large number of fine closed pores remains from the pore channels that were previously open. Incident light is diffused by the closed pores, resulting in opacity or low transmittance. The large surface is favorable for the formation of gaseous silicon oxide (SiO) during vitrification which counters the collapse of small pores since gases trapped in closed pores can no longer escape.

Therefore no additive material volatile at vitrification is needed to achieve opacity as is the case in the known process described initially. As a result contaminants which go hand in hand with the use of such additives can be avoided.

According to the invention, the synthetically manufactured $SiO_2$ granulate used is distinguished by a specific surface ranging from 1.5 to 40 $m^2/g$ and at the same time by high apparent density. The density of at least 0.8 g/cm$^3$ primarily assures that the starting body can be formed from the granulate, while the opacity of the quartz glass is substantially the result of the large specific surface, as explained above.

The specific surface of the $SiO_2$ granulate is determined according to the BET process (DIN 66132), and the apparent density according to DIN/ISO 787, Part 11.

From the $SiO_2$ granulate the starting body is formed as loose fill or as a thermally or mechanically pre-compacted body.

It has been shown that a particularly suitable $SiO_2$ granulate for use in the process according to the invention has a specific BET surface ranging from 10 m$^2$/g to 30 m$^2$/g. Good results are achieved regarding opacity or low transmittance of the quartz glass, especially in the IR spectrum, with high density and low devitrification tendency. Especially good results regarding pourability and ease of handling of the granulate were achieved at an apparent density ranging from 0.9 g/cm$^3$ to 1.4 g/cm$^3$.

In a preferred variant of the process the $SiO_2$ primary particles have an average particle size ranging from 0.5 $\mu$m to 5 $\mu$m. Such primary particles are obtained in a so-called "sol-gel" process by hydrolysis of organic silicon compounds. In an alternative and equally preferred variant the $SiO_2$ primary particles have an average particle size of less than 0.2 $\mu$m. Such pyrogenic particles are obtained by flame hydrolysis or oxidation of inorganic silicon compounds. With a view to low devitrification tendency during vitrification the primary particles are preferably amorphous.

In both process variants the primary particles are distinguished by a large free surface. Granulates in the sense of the present invention are formed by agglomeration of a plurality of such primary particles due to physical or chemical binding forces. Known granulating processes are used, especially wet granulation or extrusion of a mass containing the primary particles. Primary particles produced especially according to the sol-gel process are densely compacted when present in the granulate since they are overwhelmingly and also preferably spherical. The free surface is reduced by the contact surface of adjoining primary particles; however, as explained above, closed pores can develop between the individual primary particles during vitrification. Because the primary particles have an average size of less than 5 $\mu$m, the resulting pore distribution is correspondingly fine. The average primary particle size is determined as the so-called D50 value according to ASTM C1070.

It has been shown that in a granulate particularly suitable for use in the process according to the invention the individual $SiO_2$ granules have an non-homogenous density distribution and the inner region of lesser density is at least partially enclosed by an outer region of higher density. It is therefore possible to enclose in the inner region gases which then do not escape or only partially escape during vitrification and thus contribute to development of pores and opacity (low transmittance) of the quartz glass.

In a preferred implementation of the process use is made of granulates in which the inner region encloses a hollow space. The hollow space is enclosed at least partially by the outer region of higher density.

The outer region of porous granulates is advantageously pre-compacted by thermal treatment comprising sintering at a temperature ranging from 800° C. to 1,350° C. The thermal treatment gives the outer region a density that is higher than that of the porous or hollow inner region so that pores and pore channels in the outer region preferably shrink and close. In order to achieve this the thermal treatment is stopped or interrupted before the equalization of the initially established temperature gradient between the outer and inner region. This can be realized in a simple way by for example continuously moving the granulate through a heating zone.

A thermal treatment comprising heating in an atmosphere containing chlorine has been shown to be useful. Treatment in a chlorine-containing atmosphere removes contaminants which form chlorine compounds volatile at treatment temperatures, and OH compounds. This improves the purity of the opaque quartz glass, increases viscosity and further reduces devitrification tendency. The chlorine-containing atmosphere contains chlorine and/or a chlorine compound. In a quartz glass pure in the sense of the present invention the total contamination by Li, Na, K, Mg, Ca, Fe, Cu, Cr, Mn, Ti and Zr is less than 250 ppb by weight. Dopants are not considered contaminants in this sense.

In a preferred method the thermal treatment comprises heating of the porous agglomerates at a temperature ranging from 1,000° C. to 1,300° C. in a nitrogen-containing atmosphere and under presence of carbon. By this method, hereinafter "carbo-thermal nitriding," granules are obtained whose entire free surface is enriched by nitrogen. Nitrogen fixation is facilitated by the presence of carbon, but the latter volatilizes. It has been shown that the viscosity of the quartz glass increases due to nitrogen content. High viscosity can also be achieved with a granulate composed of $SiO_2$ granules doped with aluminum at a level ranging from 5 to 20 ppm by weight. Aluminum doping is advantageously effected by finely distributed nano-scale $Al_2O_3$ particles, assuring a homogenous distribution of the dopant. Particularly well suited therefor are pyrogenically produced $Al_2O_3$ particles because of their high specific surface.

In a first preferred embodiment the granulate is composed of rounded $SiO_2$ granules. Such a granulate is distinguished by good pourability, high apparent density and low shrinkage during vitrification and is obtained by for example the wet granulation process.

In a second equally preferred embodiment the granulate is an extrudate. Such granulate can be manufactured inexpensively by extrusion. It is distinguished by elongated $SiO_2$ granules which may also contain elongated hollow spaces.

The granulate according to the invention is particularly suited for the production of an opaque quartz glass article such as a heat shield, a reaction container and a muffle.

Such an article is distinguished in that it has an opaque quartz glass region formed from a synthetic $SiO_2$ granulate with a specific BET surface ranging from 0.5 m$^2$/g to 40 m$^2$/g and, apparent density of at least 0.8 g/cm$^3$ and formed from at least partially porous primary particles.

The opaque region is obtained by vitrifying the appropriate region of the fill. It is distinguished by high opacity in the IR spectrum, achieved substantially by forming the region from a $SiO_2$ granulate of partially porous agglomerates of $SiO_2$ primary particles, and having a specific BET surface ranging from 1.5 m$^2$/g to 40 m$^2$/g. Vitrification of such $SiO_2$ granulate results in an opaque quartz glass with a homogenous particle distribution and high density. This allows a particularly high thermal insulation effect to be attained when the article is used as intended. During granulation the fine primary particles lump together forming agglomerates with a larger diameter. These agglomerates have a plurality of open pore channels, forming a correspondingly large pore volume. The individual granules of the employed $SiO_2$ granulate are formed from such agglomerates. During vitrification the larger part of the pore volume closes due to sintering and collapsing. However, a large number of fine closed pores remains from the pore channels that were previously open and IR radiation is diffused by them, resulting in opacity in the IR spectrum.

BRIEF DESCRIPTION OF THE DRAWINGS

The invention will be explained below in more detail by way of examples and a drawing. The drawing schematically depicts in FIG. 1, the process step of vitrification exemplified in the manufacture of a hollow cylinder, in FIG. 2, the first embodiment of the $SiO_2$ granulate according to the invention by way of a section through an individual $SiO_2$ granule, and in FIG. 3, a second embodiment of the $SiO_2$ granulate according to the invention in form of spray granulate by way of a sectional view of an individual spray granule.

Figure 1:
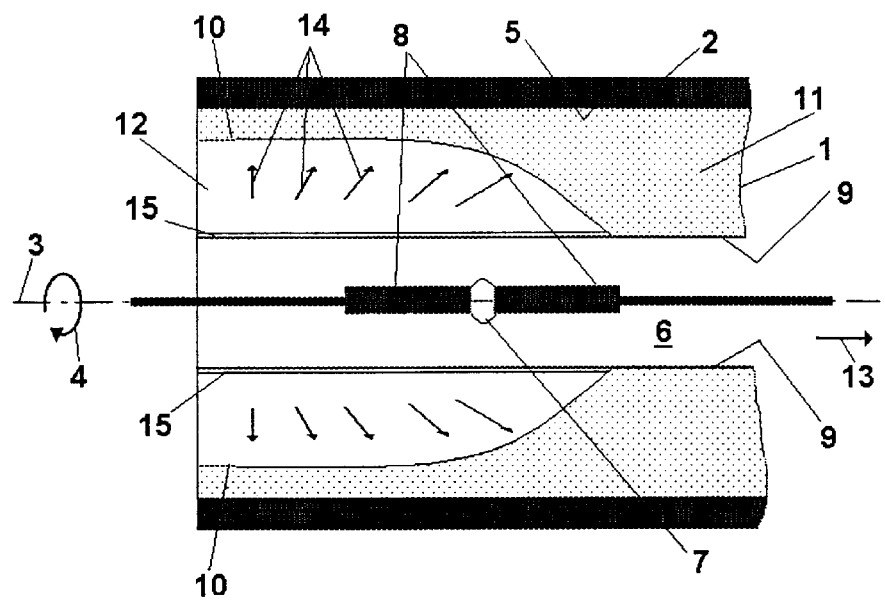
FIG. 1 schematically shows the process for the production of opaque quartz glass according to the invention in form of an opaque body obtained by the vitrification of an initially porous hollow cylinder 1. First, a more detailed explanation of the production of the hollow cylinder 1 follows below.

$SiO_2$ granulate with a specific surface of 34 $m^2/g$ and an apparent density of 1.1 $g/cm^3$ is filled into a tubular metal mold 2 which rotates about its longitudinal axis. The direction of rotation is indicated by arrow 4 in FIG. 1. Due to the effect of centrifugal force, and with the assistance of a template a rotationally symmetrical hollow cylinder 1 is formed from the fill on the inner wall 5 of the metal mold 2. The hollow cylinder 1 as fill has a thickness of about 100 mm and an inner bore 5 in form of a through bore 6 with an inner diameter of about 73 mm. The fill is easily compacted by centrifugal force before the subsequent process steps.

In the next step the mechanically pre-compacted hollow cylinder 1 is melted by means of an electric arc 7 zone by zone from the inner bore 6 of the hollow cylinder 1. An electrode pair 8 is introduced into the one end of the inner bore 6 and is continuously moved along the inner wall 9 toward the opposite end of the hollow cylinder 1 at a rate of 55 mm/min. The hollow cylinder 1 is vitrified by the heat of the electric arc 7. A maximum temperature of over 2,100° C. is achieved at the inner wall of the hollow cylinder 1.

Within the hollow cylinder 1, a vitrification front 10 is created, said front advancing to the outside in the direction of the metal mold 2 and forming the boundary ranging from an open zone 11 and an already partially melted opaque zone 12. Directional arrows 14 in FIG. 1 schematically depict the direction of movement 13 of the vitrification front 10—overlaid by the velocity of the electrode pair 8—substantially directed radially outward from the inner wall 9 of the inner bore 6. The gases trapped in the $SiO_2$ granulate cause pores to be created in the opaque zone 12, thus creating the desired opacity of the article. The density of the hollow cylinder 1 is 2.10 $g/cm^3$, the inner diameter is 140 mm and the wall thickness is 22 mm.

In this process, the region of the inner wall 9 of the inner bore 6 is compacted to a high degree due to the high temperature of arc 7. The melted body 12 is thus provided with an inner surface layer 15 composed of high-density transparent quartz glass. The tubular opaque quartz glass body 12 manufactured in this manner is worked into a high temperature resistant muffle.

Figure 2:
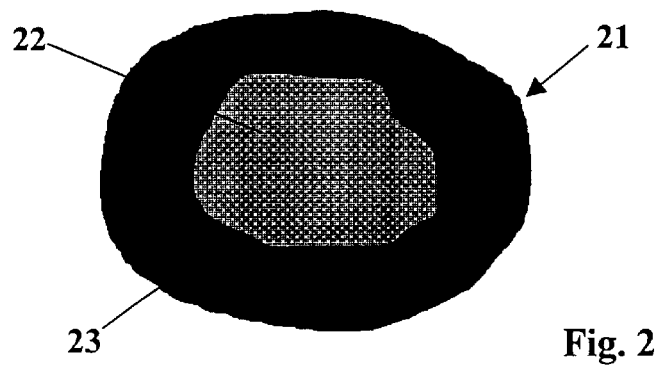

The $SiO_2$ granulate used in the described process is explained below in more detail by way of FIG. 2 schematically showing a typical individual granule. In the rounded granule 21 of porous quartz glass, a low density central region 22 is enclosed by an outer region 23 of higher density. The density of the inner region is about 40% of the density of transparent quartz glass, and the outer region it is about 60% of the latter. The boundary area ranging from the central region 22 and the outer layer 23 is fluid. The granule diameter is 420 $\mu$m, the thickness of the outer layer 23 is about 100 $\mu$m.

The granulate is produced by means of a conventional wet granulating process using a mixer. An aqueous suspension is produced from amorphous, nano-scale, pyrogenous $SiO_2$ particles with a specific BET surface of 60 $m^2/g$, produced by flame hydrolysis of SiCl4. Under constant mixing, moisture is removed from said suspension until it separates, forming a granular mass. After drying the specific BET surface of the granulate so obtained is 50 $m^2/g$ and the rounded granulate particles have a diameter ranging from 160 $\mu$m to 1,000 $\mu$m. In a continuous process the $SiO_2$ granulate is then thermally pre-compacted in a chlorine-containing atmosphere at a temperature of about 1,200° C. This also purifies the granulate; the purification by chlorine is particularly effective since the surface of the $SiO^2$ particles is accessible to the purifying gas by way of the pore channels and gaseous contaminants are easily removed. The processing rate is 10 kg/h. A temperature gradient is created in the individual granules resulting in the differing densities of the central region 22 and the outer layer 23.

The $SiO_2$ granulate obtained after such pre-processing has a specific BET surface of 34 $m^2/g$ and an apparent density of 1.1 $g/cm^3$. The average granule diameter is about 420 $\mu$m and care is taken to remove fine particles of less than 100 $\mu$m before use in the manufacture of opaque quartz glass; in this instance, however, such particles are not present due to the method of production. The total volume of contamination by Li, Na, K, Mg, Ca, Fe, Cu, Cr, Mn, Ti and Zr is less than 200 ppb by weight.

Granulate of amorphous nano-scale $SiO_2$ particles produced in this way may be used for the production of opaque quartz glass as described by way of FIG. 1. Because the individual granules of the granulate are created by agglomeration of a plurality of very small primary particles, a correspondingly fine and homogenous pore distribution is made possible, as described in more detail above.

Figure 3:
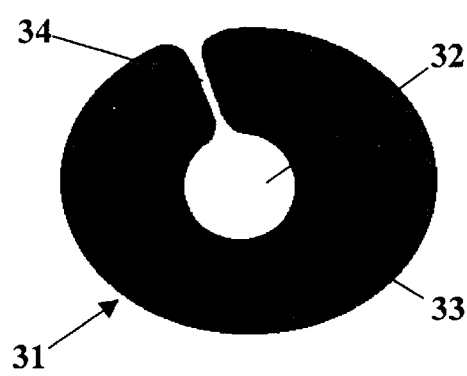

An individual spray granule 31 is schematically depicted in FIG. 3. It is typical of a spray granulate suitable for implementation of the exemplary process described above by way of FIG. 1. The typical spray granule 31 is an agglomerate of $SiO_2$ primary particles. It has a hollow space 32 surrounded by an outer layer 33. An intake funnel is formed in the outer layer 33, opening through a narrow passage 34 into the hollow space 32. The outer diameter of the spray granule 31 is about 300 $\mu$m and the outer layer has a thickness of about 100 $\mu$m.

The production of this spray granulate is described in more detail below.

Highly pure, pyrogenous, nano-scale $SiO_2$ primary particles with a specific BET surface of 70 $m^2/g$ are dispersed in de-ionized water. Aluminum in form of pyrogenous $Al_2O_3$ is added in the amount of 12 ppm by weight. The suspension is adjusted to a liter/weight proportion of 1,380 g/l. Slick viscosity is 450 mPAS. Using a commercially available spray drier (Dorst Model D400) the suspension is sprayed, at a hot air temperature of 380° C. and a slick pressure of 10.5 bar. The resulting spray granulate has an average granule diameter of 330 $\mu$m and a 0.3% residual moisture content. The specific BET surface is 54 $m^2/g$ and the powder weight is 0.6 g/cm³. The granulate is then purified and thermally compacted by passing at a rate of 6.1 kg/h and a temperature of 1,200° C. through a mixture of $HCl/Cl_2$ gases.

After the treatment the specific surface is 20 m²/g, the powder weight is 0.8 g/cm³ and the apparent density is 0.92 g/cm³. As a result of the processing method, fine particles of less than 100 µm have been separated by a cyclone during spray granulation. The total volume of contamination by Li, Na, K, Mg, Ca, Fe, Cu, Cr, Mn, Ti and Zr is less than 200 ppb by weight.

The spray granulate of amorphous, nano-scale $SiO_2$ particles so produced may be used to manufacture opaque quartz glass as described by way of FIG. 1. Because the individual spray granules are created by the agglomeration of a plurality of very small primary particles, a correspondingly fine and homogenous pore distribution is made possible during vitrification. This is additionally facilitated in that the hollow space 32 creates an additional nearly closed gas volume which remains at least partially intact during vitrification because the enclosed gas can only partially escape during vitrification, and as a result contributes to the creation of pores and therefore to the opacity of the quartz glass.

What is claimed is:

1. A process for producing opaque quartz glass, said process comprising:
   shaping a blank from synthetic $SiO_2$ granules;
   heating said blank at a vitrification temperature to create a quartz glass article;
   the $SiO_2$ granules being a $SiO_2$ granulate comprising agglomerates of at least partially porous $SiO_2$ primary particles, with a specific BET surface area ranging from 1.5 to 40 m²/g and an apparent density of at least 0.8 g/cm³.

2. The process according to claim 1, wherein the specific surface area of the $SiO_2$ granulate ranges from 10 to 30 m²/g.

3. The process according to claim 1, wherein the apparent density ranges from 0.9 g/cm³ to 1.4 g/cm³.

4. The process according to claim 1, wherein the $SiO_2$ granulate has primary particles with an average particle size ranging from 0.5 µm to 5 µm.

5. The process according to claim 4, wherein the average particle size of the $SiO_2$ primary particles is less than 0.2 µm.

6. The process according to claim 1, wherein the $SiO_2$ granulate has primary particles which are amorphous.

7. The process according to claim 1, wherein the granulate is composed of $SiO_2$ granules having non-homogenous density distribution and an inner region of lesser density at least partially enclosed by an outer region of higher density.

8. The process according to claim 7, wherein the outer region is compacted by thermal treatment comprising sintering at a temperature between 800° C. and 1,450° C.

9. The process according to claim 8, wherein the thermal treatment comprises heating in an atmosphere containing chlorine.

10. The process according to claim 8, wherein the thermal treatment comprises heating taking place at a temperature ranging from 1,000° C. to 1,300° C. in an atmosphere containing nitrogen and in the presence of carbon.

11. The process according to claim 1, wherein the $SiO_2$ granules have an average granule size ranging from 150 to 2,000 µm.

12. The process according to claim 1, wherein the blank is formed having an inner surface extending along a rotational axis and an outside surface, the blank being heated so that a vitrification front advances from the inner surface to the outside surface.

13. The process according to claim 12, wherein the blank is rotated about the rotational axis and is heated zone by zone to a vitrification temperature above 1,900° C. by an electric arc from the inner surface.

* * * * *